W. A. Lewis.
Horse Rake.

No. 91,548.    Patented June 22, 1869.

Witnesses    Inventor
Thos H Hutchins    Wm A. Lewis
Stephen M Dunton

United States Patent Office.

WILLIAM A. LEWIS, OF JOLIET, ILLINOIS.

Letters Patent No. 91,548, dated June 22, 1869.

IMPROVEMENT IN HORSE-RAKES.

The Schedule referred to in these Letters Patent and making part of the same.

Be it known that I, WILLIAM A. LEWIS, of the city of Joliet, in Will county, and State of Illinois, have invented an Improvement on a Sulky-Rake; and I do hereby declare the following to be a full, clear, and exact description of the same, reference being had to the annexed drawings, making a part of this specification, in which—

Figure 1:
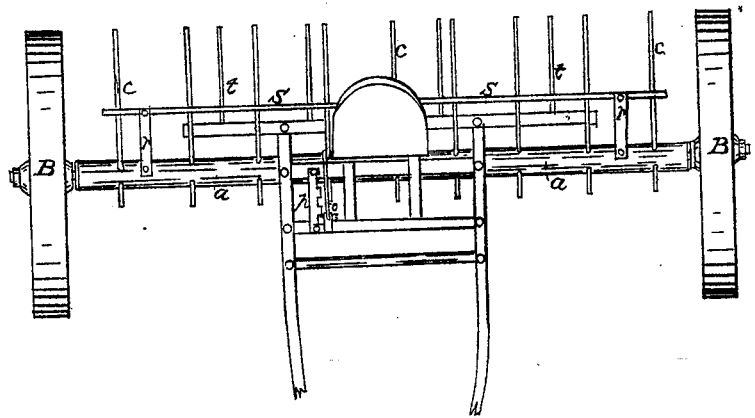
Figure 2:
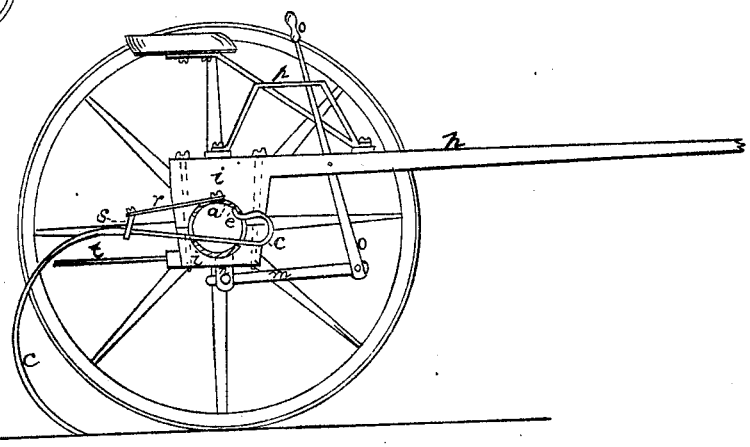

Figure 1 is a plane view on the top,

Figure 2, a cross-sectional view on the line x, and

Figure 3:
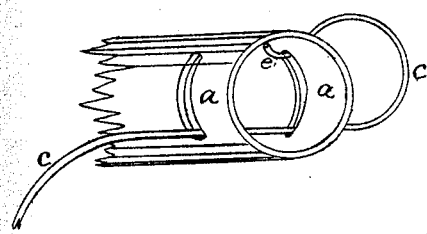

Figure 3, a perspective view of a section of the rake-head, and rake-tooth therein.

The nature of the improvements I claim to have made is as follows:

I employ a hollow tube, constructed of metal, for the rake-head, which tube I designate by the letter a.

To the ends of the tubular rake-head I attach axles, for the wheels b, as shown in fig. 1.

The rake-head has a series of cross-slots cut in, opposite to each other, on either side of the head, as is shown in fig. 3, through which the teeth e pass, as shown in said figure, the peculiar shape of which is shown in fig. 2, and which I desire particularly to be observed.

The teeth are made of spring-steel, similar to those in common use.

The manner of placing the teeth in the head is to pass the lower end of the tooth through the slots from the front side of the machine, until it comes to the upper end of the tooth, which is compressed until the upper end, e, fig. 3, which is bent up, catches in the upper end of the slot, which holds the tooth firm in place, and acts as a spring to hold the tooth down to its work.

The use of such a tubular head obviates several difficulties in other machines. It will not spring or sag down, is very much lighter and stronger, and furnishes the easiest mode of attaching the teeth.

The thills, h, are attached to the rake-head by boxes, i, fig. 2, in which the rake-head partially revolves, for the purpose of lifting up the rake to let the straw out. This is accomplished by means of the lever o and arm m, attached to the joint n, which attaches to the rake-head on the under side.

It will be seen, that as the lever o is pushed forward, the teeth are raised, and as it is pulled back, they are let down; or they may be held at any point desired, by placing the lever o in the notches on the frame p.

r r are two springs, attached to the rake-head and to the bar s, through which the teeth pass.

These springs and arm tend to keep the teeth all on a level with each other.

t is a secondary rake, attached to the thill-boxes, for the purpose of keeping the straw from getting above that point.

Claims.

1. The arrangement of the tubular rake-head a with the teeth e, as shown and described.

2. The arrangement and combination of the tubular rake-head a, wheels b, and lever o, the whole operating substantially as shown and described.

WILLIAM A. LEWIS.

Witnesses:
 THOS. H. HUTCHINS,
 STEPHEN V. BURKES.